United States Patent Office 3,302,791
Patented Feb. 7, 1967

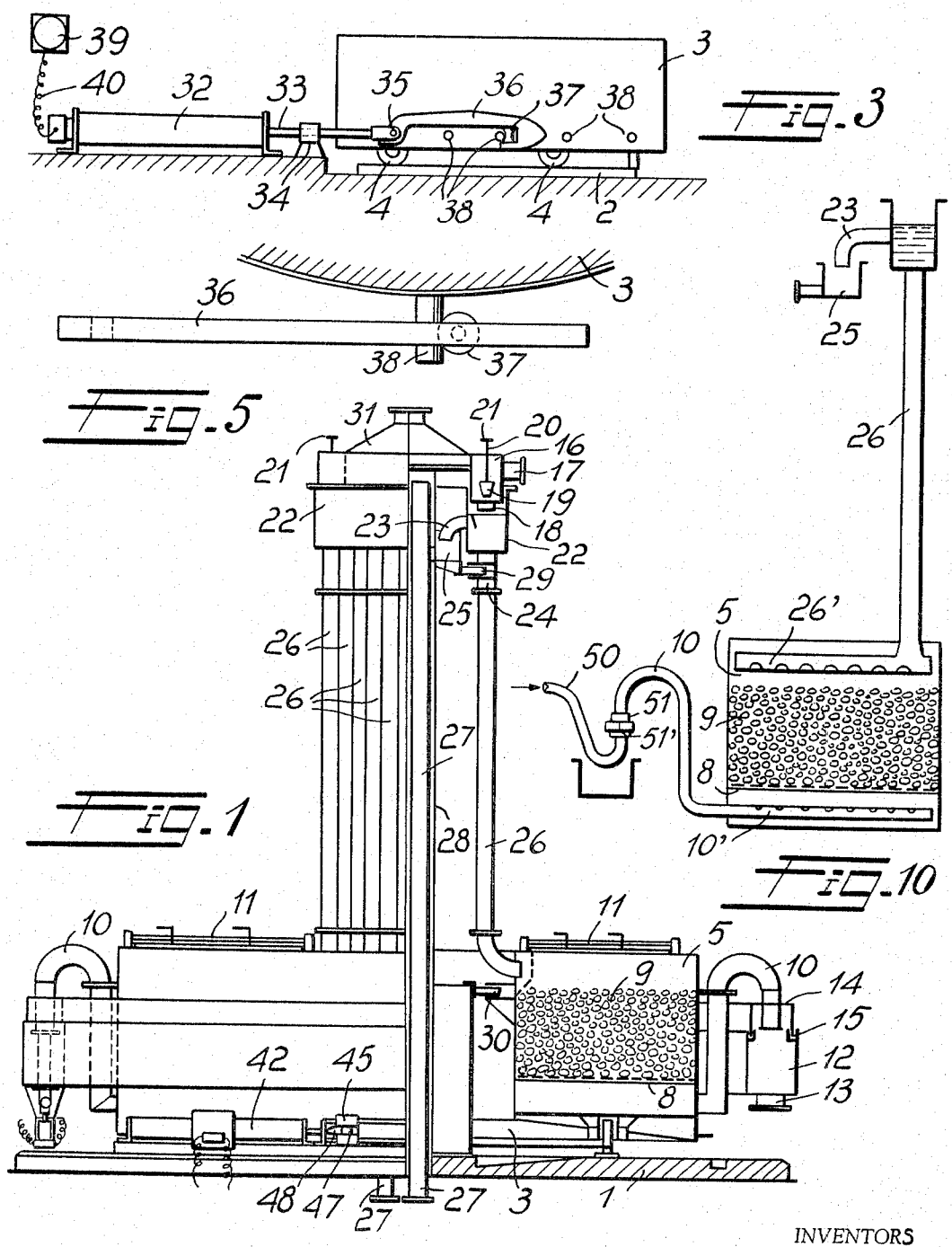

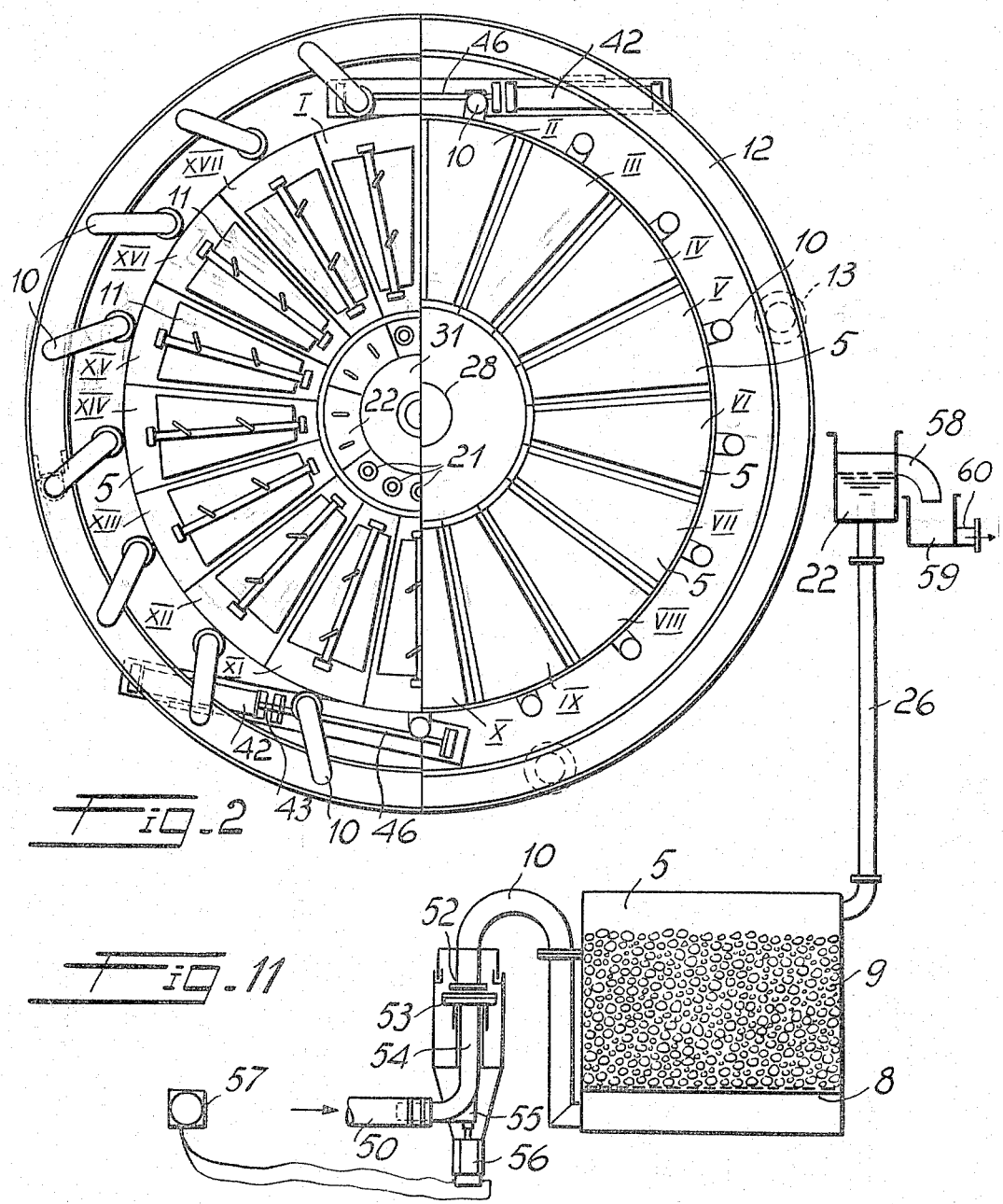

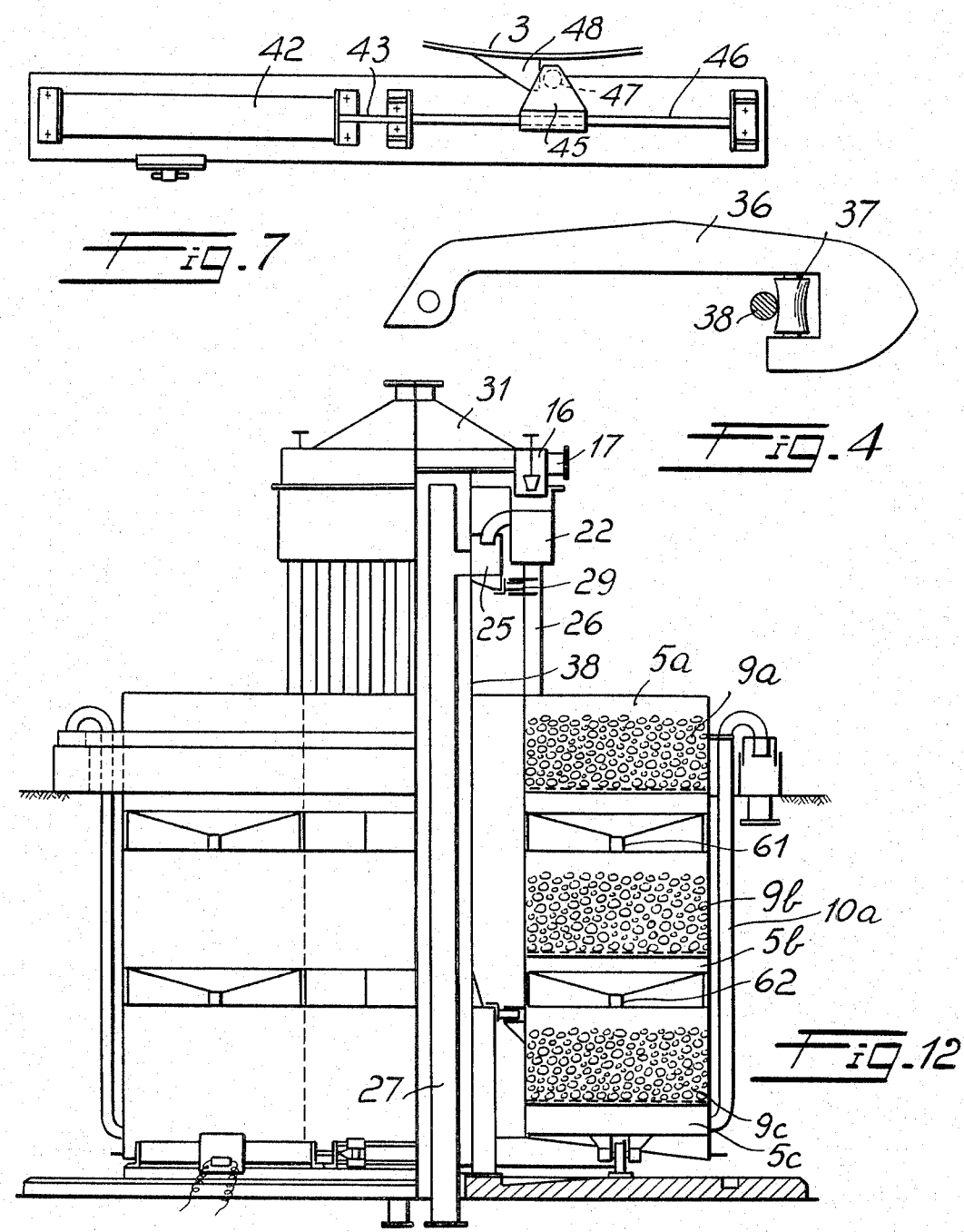

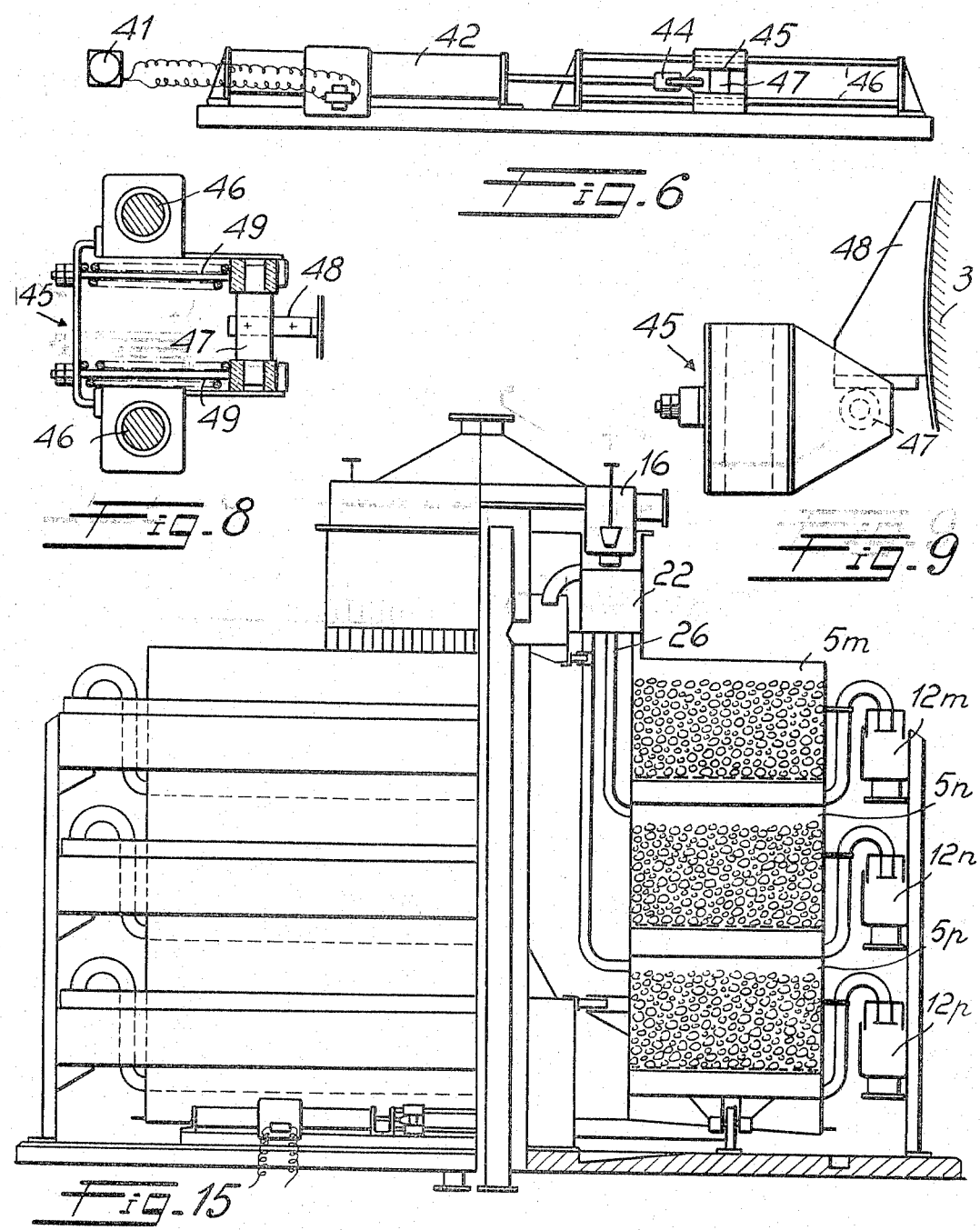

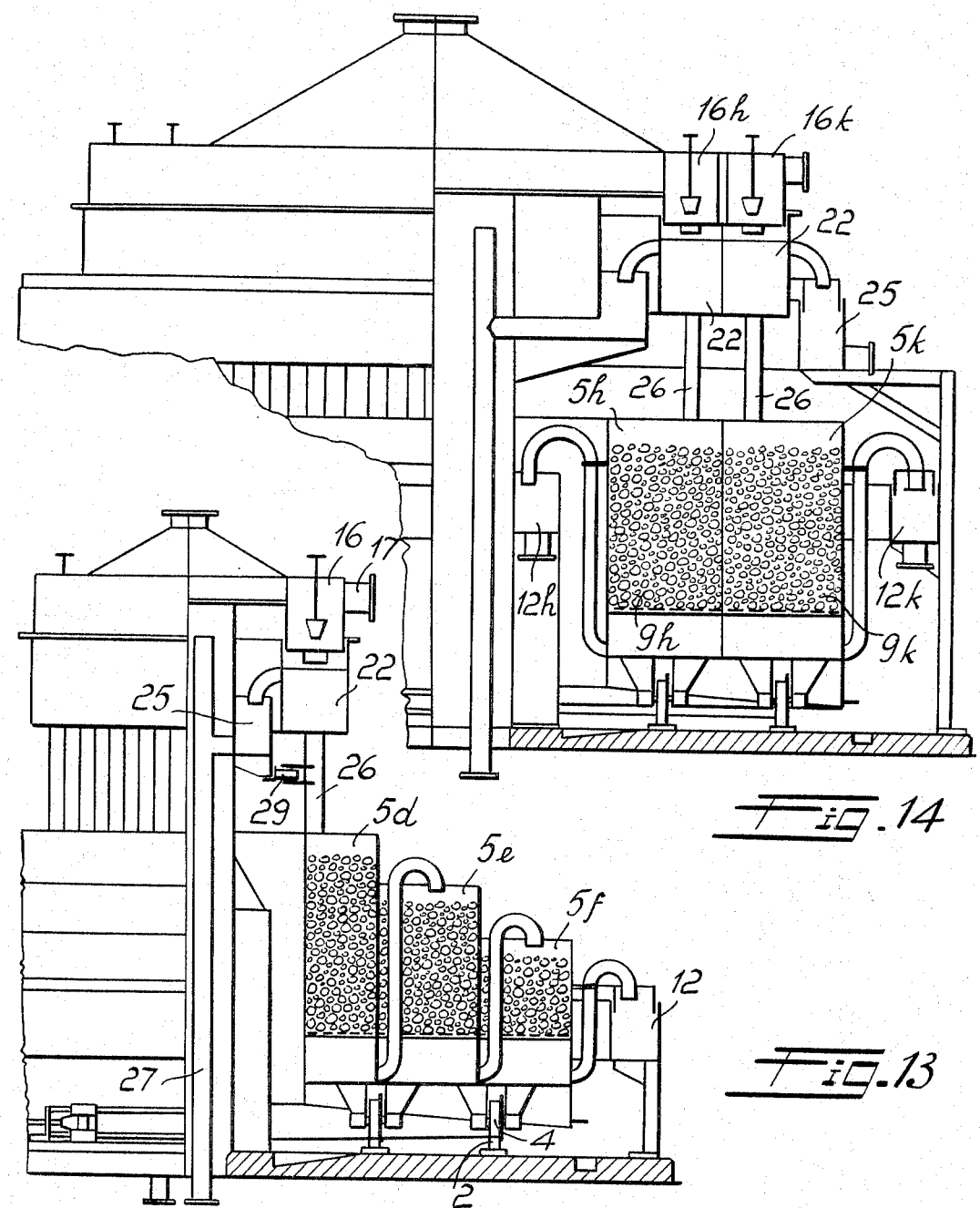

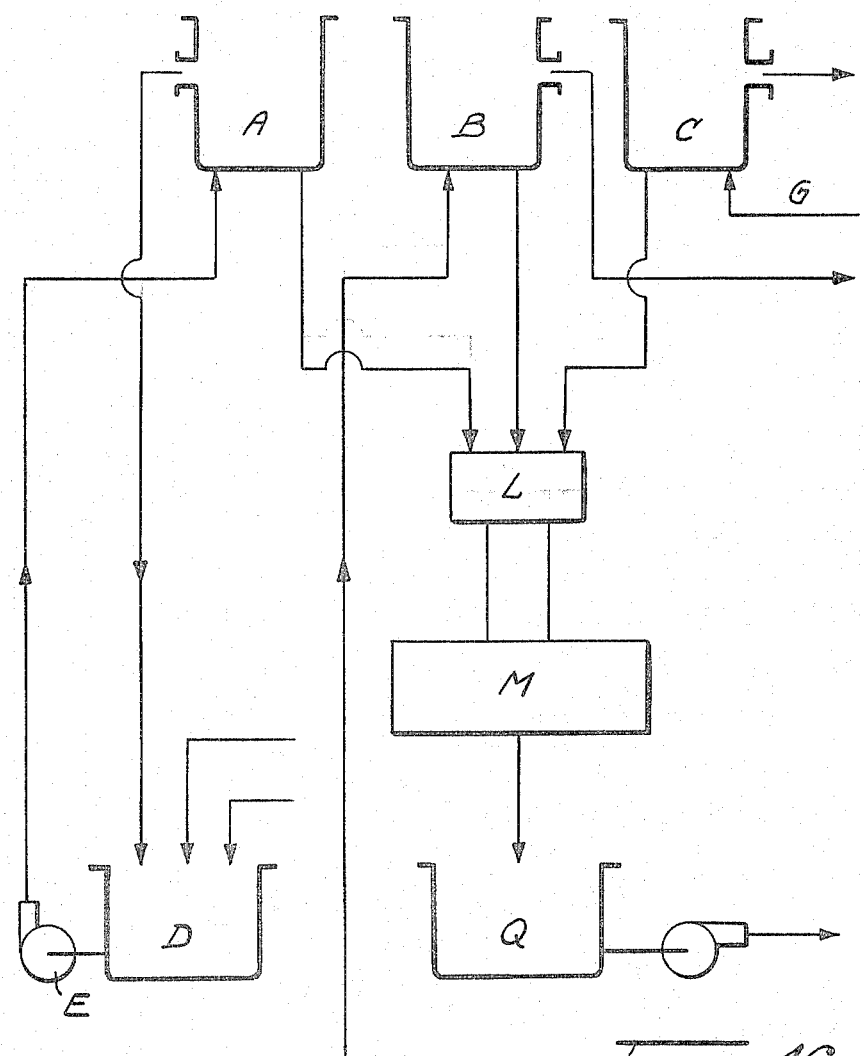

3,302,791
APPARATUS FOR TREATMENT OF SOLUTIONS BY BODIES OF GRANULAR SUBSTANCES WHICH MAY BE REGENERATED
Giuseppe Assalini, Via De Gasperi 19/3, and Giuseppina Brandoli, Corso Sardegna 46/8, both of Genoa, Italy
Filed Sept. 26, 1963, Ser. No. 311,774
Claims priority, application Italy, Oct. 6, 1962, 19,848/62; Aug. 2, 1963, 15,822/63
4 Claims. (Cl. 210—203)

This invention relates to a process and an apparatus for the physical, chemical or physical-chemical treatment of solutions or liquid materials generally by means of filtering, decolorizing, purifying by ion exchange substances or other dry substances which can be regenerated after their exhaustion.

There are several known processes and machines for the treatment of solutions or liquids, such as sugar juices, water or liquors of any kind which react with solid substances or trickle through them, undergoing a mechanical treatment like, for instance, filtration, decoloration or the like, or undergoing other treatments in order to remove ionzable compounds from solutions of ionizable and non-ionizable compounds, or other similar treatments.

Among the known apparatus for the realization of processes of the above mentioned type, there are stationary units, with batch or programmed operation, and other ones in which a series of vessels containing the required solid material is made to move with continuous rotary motion, and is combined with feed and discharge devices for the various liquors, such as liquor to be treated, regenerating liquor and wash liquor, according to their position during the rotation.

Vessels of such plants operating continuously are operated under vacuum, so that a too high trickling rate results, which endangers the result of the corresponding technological process.

Both in batch plants with programmed cycle and in continuous plants operating under vacuum or under pressure there is a need for distributing valves for liquors, which are expensive and unreliable and require heavy maintenance expenditures.

More exactly usch plants for continuous treatment of solutions or liquors by means of one or more solid substances having powdered or granular form and forming a permeable mass, include several containers each shaped like a circular sector and supported by a frame which rotates around the vertical axis of a circle formed by said containers.

Liquor to be treated, regenerating liquor and wash liquors are fed continuously, at fixed points into the above containers: as the rotational velocity is very slow in order to alow the completion of the desired action or reaction between the liquor and the solid substances, there is undesired and harmful mixing of the various liquors during the slow passing of every partition wall of two continuous containers under the feed pipe of each liquor.

Liquor to be treated, regenerating liquor and wash liquor are mixed together, thus preventing an adequate washing of the exhausted solid substance.

Feeding and discharging of the liquor to be treated also is difficult in such apparatus.

The purpose of this invention is to eliminate all the above disadvantages and to obtain conspicuous advantages in comparison with known processes and devices.

Specifically, the process according to the present invention uses a plurality of contiguous containers each containing one or more purifying, filtering or similar dry substance, and each being fed at certain points with the proper amount of the liquor to be treated, and subsequently with regenerating and wash liquors, without any of the above mentioned mixing, because all the containers rotate with jerky movements, so that they remain stationary for the time the desired action or reaction is performed, while every movement and therefore every passing of the partition wall of two contiguous containers under the feed pipes of the various liquors, is performed very quickly.

In other words the stationary periods of the containers are interspaced by quick jerky movements, actuated by drive devices which make the series of containers rotate on a close circuit having shape and dimensions established from case to case according to requirements.

The process according to the present invention is characterized by the fact that masses, bodies or layers of the same solid purifying material or more than one mass, or body or layer of purifying materials for a single treatment may be traversed in parallel or in series by the same liquor to be treated.

According to this invention the process can include a backwash stage of the exhausted solid substance.

It is also an object of this invention to provide an apparatus and a plant for realizing above process, which plant includes one or more series of contiguous containers, placed along a closed circuit, and combined with devices to feed the various liquids to each container, each time it passes a certain position; this feeding can be practiced also under pressure.

It is another object of the present invention to provide each container with a device for discharging the liquids and, if necessary with other devices which allow a backwash of the mass or layer of solid material.

Every jerk will move the plurality of containers through a path equivalent to the distance between the vertical axes of two contiguous containers, and the passing of the partition walls under the feed pipes of the various liquids is so quick as to prevent any harmful mixing.

The present invention comprises also a driving device which causes a jerky advance movement of the plurality of containers, such a device including a pneumatic cylinder, or a morto-reducer, or an electro-magnet, combined with a cycle timer or a combination of the above devices.

Generally speaking the purpose of this invention is to provide a method or process as well as an apparatus, according to which a series of separated and contiguous containers, each charged with a mass or layer of dry, powdered or granular substance of the filtering, decolorizing or purifying by ion exchange type or the like, are made to move in a closed circuit with bodily movement, at jerks of equal amplitude, and in which containers the solution to be treated with the above substance or substances as well as a wash liquid and a regenerating liquid of the above filtering, decolorizing or purifying substance or substances are consecutively fed, when they reach fixed points previously selected on their path and from which containers they are later discharged.

According to a preferred embodiment, the apparatus for realizing the above process includes a unit comprising the containers, having the shape of a figure of revolution with a vertical axis, rotating with bodily movement around this axis, with a high displacement velocity from one position to the following position and with uniform time intervals between one movement and the next, intervals which are adjustable according to the technological results that are to be obtained, said unit supporting the various containers charged with the masses of the purifying substance or substances according to the different stages of the treatment, as well as ducts and feed devices of the solutions to be treated with said masses, which solutions are fed through annular fixed ducts, while at least one effluent launder is placed in the lower part of the apparatus.

In the above mentioned case each container is provided with one or more overflow pipes which discharge the treated liquid, the wash liquid and/or the regeneration liquid in their respective effluent ducts, this duct or ducts having such height and shape as to maintain constant the mass or masses of the purifying, filtering and/or decolorizing substance under a positive head of liquid, at any feed rate.

Said arrangement ensures an even distribution of any liquid during its trickling through the mass of solid substance and avoids the complete drainage of said mass.

Moreover the apparatus has one or more effluent launders which in their lengthwise extent are divided into as many sections as the technological phases of the process, each section being provided with an indepedent discharge duct in order to avoid the mixing of various liquids during the various phases of the process.

Another purpose of this invention is to provide an apparatus which includes more than one concentric series of containers placed in one or more horizontal planes with such feed and overflow ducts that the influent liquids can trickle through the entire series of containers by means of pumps, by gravity or by syphoning.

The apparatus according to this invention is also characterized by the fact that the head pipes can be maintained at constant level and therefore, any container in any angular position is constantly fed at a constant pressure previously established.

Other characteristic features and advantages will appear evident from the following detailed description, which is to be considered in conjunction with the accompanying drawings, of which:

FIG. 1 illustrates, half side view and half diametral cross section, an embodiment of the apparatus according to this invention.

FIG. 2 is a plan view, half top view and half cross section of the lower part, corresponding to the containers, of the apparatus illustrated in FIG. 1.

FIG. 3 shows schematically a side view of a practical realization of the device which moves by jerks the plurality of containers.

FIG. 4 and FIG. 5 show in enlarged scale and respectively in side view and plan view a detail of FIG. 3.

FIG. 6 and FIG. 7 illustrate, respectively in side view and in plan view, another form of realization of the device which produces the jerky movement.

FIG. 8 and FIG. 9 show, in enlarged scale, a detail of FIG. 6 and FIG. 7.

FIG. 10 and FIG. 11 show diagrammatically two different forms of realization of connection of the ducts of a container in order to achieve the backwash.

FIG. 12 illustrates schematically an apparatus according to this invention, provided with three concentric series of containers, placed one above the other and operating in series.

FIG. 13 illustrates another form of the subject apparatus, comprising three concentric series of containers, placed side by side and operating in series.

FIG. 14 shows another form of the above mentioned apparatus comprising two concentric series of containers, placed side by side and operating in parallel.

FIG. 15 shows another form of the apparatus, similar to that one illustrated in FIG. 12, but with three series of containers operating in parallel.

FIG. 16 illustrates the flowsheet of a complete installation which uses a continuous ion exchanger according to the present invention in order to remove calcium ions from sugar bearing solutions.

With particular reference to FIGURES 1 and 2, which show the simplest form of the apparatus according to the invention, it will be noted that the subbase 1 has a circular rail 2 upon which the wheels 4 roll, being attached to the rotaitng structure 3, which supports the containers 5, these having in this particular case the shape of circular sectors, identical to one another, and disposed side by side about the circular extent of the structure 3.

Each container 5 is provided with a support 8, permeable to liquids, which holds the filtering, purifying or decolorizing substance marked 9 on the drawing and being usually a granular mass.

Each container 5 is provided with a syphon shaped discharge pipe 10 having such a form and height as to leave the substance 9 always submerged in the liquid, the level of which remains constant during the treatment phase.

The discharge pipes 10 of the various containers discharge into annular launder 12, which is divided in as many parts there are effluents from the containers, which effluents will vary in quality and number according to the technological process which the apparatus performs. Each part of the effluent launder 12 has a flanged port 13 for the discharge of its respective effluent by gravity or by means of pumps.

The effluent launder 13 is closed at the top by a cover 14 which rotates with the discharge pipes 10 of the containers that pass through it.

Preferably the cover 14 is provided with a hydraulic seal 15 in order to prevent the escape of gases and/or steam from effluent launder 12.

In order to feed the various liquids into the containers 5, containing the granular substance or the substances 9 or the like, an annular manifold 16 is provided which is divided by radial partitions in as many parts as the liquids to be fed into the apparatus.

Each part of said manifold is provided with a part to be connected with the feed pipe of its respective liquid.

The lower part of the manifold 16 is equipped with nozzles 18 for direct or indirect feeding of the containers 5, the number of said nozzles 18 being equal to the number of the containers 5. Said nozzles 18 are fed at constant pressure which can be obtained by means of head pipes charged by constant level tanks, or by means of suitable pumps.

The openings of nozzles 18 are controlled by means of regulators 19, each comprising a conical plug, a threaded shaft 20 and a hand driven wheel 21.

The manifold 16 can also be equipped with other devices suitable for regulating the flow, such as for instance, calibrated orifices, Venturi meters or similar devices.

Nozzles 18 discharge their respective liquids into the containers or, when a certain head is required for said liquids so that they enter the containers at a predetermined pressure, they discharge the respective liquids into an annular feed distributor 22, divided into as many parts as the containers 5.

Each of said parts is squipped with one overflow pipe 23 and with a flanged outlet 24. The overflow pipes 23 discharge into an annular launder 25 divided into as many parts as the destinations of the various overflow liquids. These are discharged from the apparatus through discharge pipes such as pipe 27.

The outlets 24 are connected with pipes 26 which discharge each into one container 5, said pipes 26 being provided only when the trickling of the liquids through the solid substance 9 requires a certain pressure or in other words a hydraulic head, according to the type of substance 9, to the viscosity and to the flow of the liquids.

The hydraulic head in the pipes 26 can be controlled by means of a conventional head pipe, not shown on the drawings or by means of a suitable pump.

The pipes 27 are placed around a fixed tower 28, which bears rails upon which the centering idling wheels 29 and 30, attached to the moving parts of the apparatus roll freely. The upper part of the apparatus shown in FIG. 1 is equipped with the hood 31 in order to vent gases, steam or smoke which may develop during the treatment.

FIGURES 3, 4 and 5 show an embodiment of the device to accomplish the jerky movement of the rotating part of the apparatus.

A cylinder 32 is equipped with a piston attached to the rod 33 and is actuated, with proper timing, by a fluid under pressure.

Feed and discharge of said fluid are controlled by a cycle timer 39, of any known or preferred type, which through the connection 40 actuates the fluid inlet and outlet valves of the cylinder 32.

The motion of the piston rod 33 is guided by a bearing 34. The outer end of said piston rod is attached by means of a Cardan joint 35 to a hook 36 bearing a roller 37.

On the external face of the rotating part of the apparatus there are as many pegs 38, placed at equal intervals, as the containers 5, on which pegs the harpoon hook 36 engages at certain times.

The stroke frequency of the piston within the cylinder 32 depends upon the stationary periods of the containers, which periods are individually set according to the reactions or physical or physico-chemical treatments that have to be accomplished according to the particular technological process being performed.

Therefore the stroke frequency of the cylinder for the movement of the structure 3 and the velocity of said movements are adjustable within certain limits by setting the cycle timer 39 and by regulating the pressure of the feed fluid.

When the actuating device is in the position shown in FIG. 3, that is to say one peg 38 is engaged with the roller 37 of the hook 36, which is at the outer end of its stroke, the movement of the structure 3 through one increment at the given time is effected by means of the fluid introduced into the cylinder 32 following the cycle timer 39, so that the piston is rapidly displaced toward left, looking at FIG. 3, along with the piston rod 33 and the hook 36.

The peg 38 engaged with the roller 37 is also pulled toward the left, thus making the structure 3 rotate, with the wheels 4 upon the circular rail 2.

The motion of the structure 3 is circular, while the motion of the hook 36 is rectilinear, so that the roller 37 rolls on the peg 38 during its displacement, with a minimum of friction, until roller 37 and peg 38 disengage thus causing the structure 3 to stop after having travelled the planned increment, while the piston rod 33 continues its movement.

When this is completed, fluid controlling valves of the cylinder 32 are actuated by the cycle timer 39 in such a manner as to cause the piston rod 33 to move again toward the right.

During this motion the hook 36, due to its particular shape glides over the following peg 38, on which the roller 37 remains engaged at the end of the motion to the right, ready for a new incremental displacement of the structure 3.

Said displacement is repeated, along with the forward and backward movement of the piston each time the cycle timer actuates the fluid control valves.

All the controls are so adjusted that the srtucture 3 rotates substending an angle equivalent to 360°:$n$, if $n$ is the number of containers 5.

FIGS. 6, 7, 8 and 9, illustrate another drive device which can be used instead of the one shown on FIGS. 3, 4 and 5.

Also in this case a cycle timer 41 which controls, at predetermined times, the inlet and outlet of the pressure fluid in the cylinder 42 in which a piston, not shown on the drawings, glides and to which the piston rod 43 is attached. The outer end of said piston rod 43 is connected by means of a suitable joint 44 to a sledge 45, engaged and sliding in two guide ralis 46, bearing a roller 47 with vertical axis and supported elastically by springs 49.

At predetermined intervals the roller 47 engages with each of the pegs 48, having proper shape and size, attached to the structure 3, said pegs 48 replacing the pegs 38 of the previously mentioned example.

The pegs 48 equal in number the containers 5 and have the shape detailed in FIG. 9; in other words they are characterized, in plan view, by an inclined surface on the side toward the cylinder and by a vertical surface on the opposite side.

The operation is similar to the one already described, with the only difference that the engagement and the disengagement between the pegs 48 and the roller 47 are smoother.

With reference to FIGS. 6 and 7 after a leftward stroke of the piston, the structure 3 has rotated one increment and the peg 48 has disengaged from roller 47; during the backward stroke of the piston which carries back the sledge 45 into the position shown on FIGS. 6 and 7, the roller 47 hits the inclined surface of the peg 48 which is now in place of the one previously considered and slides upon it.

That is to say that due to the inclined surface and to the elastic mounting of the roller 47, the springs 49 are pressed until the roller 47 reaches the most protruding point of peg 48. Immediately after said point the springs 49 bring the roller 27 back into its normal position as shown in FIG. 7.

FIG. 10 shows in detail one of the containers 5 undergoing a backwash of the granular mass 9 which it contains.

The pipe 26 has an horizontal punctured extension 26′, which extends for almost all the container width.

A similar extension 10′ is provided for the overflow pipe 10, which extension is placed horizontally under the support 8 of the granular substance 9.

For those processes which require a backwash or a periodical mixing of the substance 9 or a similar operation before its regeneration, when each container 5 arrives at the proper position for said treatment, the discharge pipe 10 is connected to a duct 50 which feeds the liquid 17 or the gas which performs the proper treatment.

FIG. 10 shows, as an example, a quick closing coupling which is commonly used for connecting flexible hoses, by manual operation, by making the parts 51 and 51′ engage with each other and than rotating one of them for a fraction of a turn.

After that, the wash liquid for instance, is made to flow in the direction shown by an arrow on FIG. 10, thus passing from the flexible pipe 50, into the pipe 10 and the pipe 10′; then it passes through the mass 9 and, provided enough pressure is available, it enters the pipe 26′, and rises in the pipe 26 until it reaches the overflow discharge 23, from which it flows into the launder 25, and thence to waste.

In FIG. 11 the syphon overflow pipe 10 is equipped with a flange 52 which faces another flange 53 equipped with a rubber gasket, which flange 53 is connected to a pipe 54 attached to the flexible pipe 50 which feeds the backwash fluid.

The pipe 54 is also connected to a rigid support 55 which moves vertically according to the impulses of an electromagnet 56 or other device which is actuated periodically, in perfect synchronism with the jerky advance movements of the containers 5, by means of a cycle timer 57. Thus, when one of the containers 5 has reached the proper position for a backwash operation, the timer 57 actuates the electromagnet 56 which pushes the flange 53 against the flange 52 by means of the rigid support 55; a leak-proof connection is thus made between pipe 10 and pipe 50, allowing the fluid fed by the latter to enter the container 5, pass through the mass 9, rise in the pipe 26, overflow into launder 59 through overflow outlet 58, and be discharged via opening 60.

Preferably the discharge ducts of each container will be combined with suitable devices in order to retain the solid particles which might be carried along with the effluent liquids.

The operation of the device shown in FIGS. 1 and 2 and already described is as follows:

A certain number of containers 5, for instance twelve to seventeen, are fed at the same time with the liquid to be purified, filtered or otherwise treated by means of layers of granular substance 9 selected according to the technological treatment to be performed.

Let us suppose that the treatment is the removal of calcium ions from a sugar bearing solution by means of cation resins with strong basic charges, which resins form the layers of all the containers 5.

The sugar bearing solution is introduced when twelve containers are located along a predetermined arc of the circular path by means of the respective pipes 26 fed by the same manifold 16, which has the same angular relationship as the twelve containers 5.

Each of said containers discharges the liquid which has passed through the mass 9 by means of a syphon overflow pipe 10 into the same effluent launder 12, where effluents from all the twelve containers 5 are mixed together and discharged through the outlet 13.

Simultaneously the mass 9 is contacted in the thirteenth container by means of water fed to this container through pipe 26, feed distributor 22 and nozzle 18, said water being supplied from a small part of the feed manifold 16.

Usually the effluent from the thirteenth container is mixed with the effluent from the preceding twelve containers.

At the same time the mass 9 is backwashed in the fourteenth container in the manner described earlier referring to FIGS. 10 and 11.

The mass 9 of cation resins is simultaneously regenerated in the fourteenth container, by feeding a regenerating solution, introduced in the same manner as the sugar bearing solution. In this particular case the regenerating liquid is a 10% sodium chloride solution.

First and second water wash of the regenerated resins are simultaneously performed in the sixteenth and seventeenth containers.

After the predetermined dwell time has elapsed, the structure 3 which supports the containers 5 is made to rotate quickly one increment by means of the simultaneous actuation of both drive cylinders 42, which move their respective sledge 45, said cylinders 42 being placed at two diametrically opposite positions.

Then the first through the eleventh containers, though having advanced one increment, are still fed with sugar bearing solution, as well as the seventeenth container, which is regenerated and washed, while the twelfth container undergoes the sweetening phase, the thirteenth is backwashed, the fourteenth is regenerated, and the remaining two are washed with water.

After a new stationary period, all the containers 5 advance another increment, reaching immediately the next position, and this is repeated for each rotation of structure 3.

The process is thus made continuous with all the inherent advantages while the jerky and quick advance of the containers avoids any possible mixing of effluent liquids, as each container 5 discharges into a proper section of the effluent launder 12.

The largest part of the granular, purifying substance in the process and apparatus covered by the present invention is always in an active phase, while only a small part of the total mass is, at any instant, in a passive phase of regeneration and/or washing.

In comparison with conventional batch plants so far built, there is a conspicuous saving, as far as volume of granular purifying matter is concerned, for a given flow of liquid to be treated.

The same applies also to influent liquids, as the feed sections in the feed manifold are separated from each other and the movement of the containers is very quick.

The layout of a complete plant for the treatment of sugar juice as previously described is illustrated in FIG. 16, which embodies a continuous ion exchange apparatus according to the present invention, for instance that one shown by FIGURES 1 and 2.

The plant of FIG. 16 has three constant level tanks A, B and C, the first one (A) for the regenerating liquid, the second one (B) for the moistening and wash water, the third one (C) for the liquid to be treated, that is in this case sugar juices.

The regenerating solution is fed into tank A by means of the pump E which draws from the tank D, where such a solution is prepared and where the solution overflowing from tank A is returned in order to keep a constant level in the said tank.

The tank B is fed from the water distribution net and a constant level is maintained by means of an overflow weir, while sugar juice produced in another factory department is fed into the tank C by means of the duct G. An overflow weir keeps a constant level and the excess juice is returned to a proper vessel.

From the tanks A, B, C the respective liquids are sent into the feed distributor L of the ion exchange apparatus M, which carries the various containers that move with jerky motion.

The feed distributor L receives the liquid coming from the tanks A, B, C respectively in three separate compartments of the annular feed distributor marked 16 in FIGURES 1 and 2 as already described.

The ion exchange apparatus M is fed at a proper pressure, such as to overcome the resistance which the most viscous liquid encounters when flowing through the layers 9 of the granular material in the containers 5 of the apparatus M.

The treated liquid is collected in tank Q and sent by means of a pump to further processing or to a convenient disposal.

In the example of FIG. 16 the above mentioned pressure is obtained by placing the constant level tanks A, B, C above the apparatus M, at a convenient elevation.

In other instances, a constant pressure can be obtained by means of constant displacement feed pumps.

As an example some data are detailed herein after concerning flows and times for removing calcium ions from sugar bearing solutions.

Assuming that calcium ions are to be removed from a flow of 240 m.$^3$/hour of sugar solution having a density of 15° Brix and a hardness of 25 French degrees by means of strongly basic cation resins having an exchange capacity of 70 grams of $CaCO_3$ per liter of resin with a regeneration level of 240 grams per liter of resin.

In order to maintain the normal values for the proper operation of the resins the following quantities of same are to be used in the various sections:

|  | Liters of resin |
|---|---|
| Calcium ion removal—12 containers with | 5280 |
| Sweetening off—1 container with | 440 |
| Backwash—1 container with | 440 |
| Regeneration—1 container with | 440 |
| First wash—1 container with | 440 |
| Second wash—1 container with | 440 |
| Grand total | 7480 |

If the dwell period of each container is adjusted to 30 minutes the following flows and capacities are obtained in the various steps of the process.

*Calcium ion removal* m.$^3$/h. 240:12=m.$^3$/h. 20 per container

Detention time 30 mins. ×12=360 mins.=6 hours m.$^3$/h. 20×6 hours=m.$^3$ 120 of sugar solution treated per container and per cycle.

The $CaCO_3$ content of 12 m.$^3$ of sugar solution is supposed to be 30,000 grams.

Grams 30,000:440=68 grams per liter of resin.

Sweetening off

According to experience 2 liters of water per liter of resin are required.

Backwash from 150 to 200 liters of water per min.

Regeneration liters 440×240 grams=grams 106,000 NaCl as 10% solution.
liters 1060:30 mins.=35.33 liters/min.
liters 35.33:440=liters 0.080 per liter of resin/min.

First wash liters 1060 water:30 mins.=35.33 liters/min.
liters 35.33:440=liters 0.080 per liter of resin/min.

Second wash liters 2640 water:30 mins.=88 liters/min.
liters 88:440=liters 0.200 per liter of resin/min.

As mentioned before, all of the twelve containers treating the sugar solution discharge the effluent into the effluent launder 12; however the degree of calcium ion removal of the effluents from first containers, which contain highly active resins differ from those of the last containers, where resins are less active having been partially exhausted.

All the effluent are mixed together in the effluent launder 12 together with the sweetening-off water, therefore the effluent from the launder 12 has constant chemical and physical characteristics.

If one takes simultaneously samples of the effluents from the twelve containers and from the thirteenth, the following data are found:

| Container | Percentage calcium ions removal | ° Brix |
|---|---|---|
| I | 98 | 12 Sweetening on. |
| II | 100 | 13 Sweetening on. |
| III | 100 | 15 Sweetening on. |
| IV | 100 | Do. |
| V | 100 | Do. |
| VI | 100 | Do. |
| VII | 100 | Do. |
| VIII | 98 | Do. |
| IX | 98 | Do. |
| X | 86 | Do. |
| XI | 96 | Do. |
| XII | 97 | Do. |
| XIII | 85 | 6 Sweetening off. |
| Average | 99.54 | 13.92. |

The process and the apparatus of this invention are suitable for several other applications besides the purification of sugar solutions: as nonlimiting examples the following are mentioned: filtration, percolation, leaching, washing, ion exchange purification, decoloration, diffusion and other treatments which require a liquid to come in contact with a granular, powdery or at any rate porous solid substance.

The solid substances which are mostly used for the processes which can be performed with the apparatus of this invention are diatomaceous earths, activated carbon, ion exchange resins, sands, decolorizing earths and similar products.

Obviously the apparatus here described can be embodied in different forms, which all are within the scope of the present invention.

For instance, the feeding of the various liquids into containers 5 can be performed by means of vacuum induced in said containers by vacuum pumps, ejectors or other suitable devices, insead of positive pressure.

According to another variant, the feeding, both with vacuum or positive pressure, can be accomplished upwardly from the bottom of the containers to the top, and in any case the containers shall have such dimensions as to allow the free expansion (toward the top) of the granular purifying substance, which expansion occurs, generally speaking, when a liquid or a gas is fed from the bottom of the containers.

In order to avoid that the liquids overflowing from the containers 5 carry along solid particles of the granular substances therein contained, the outlet openings of said containers and/or the ducts attached to them, are equipped with nets, perforated plates, screens, hydraulic cyclones or similar devices which allow the free flow of the liquids but retain the solid particles.

The apparatus shown in FIG. 12 differs from the one of FIG. 1 in that it has three superposed series of containers 5a, 5b and 5c.

The liquid to be treated, fed as in the case of FIG. 1 (equal or equivalent pieces of equipment are indicated with the same reference numerals as in FIG. 1) from the pipes 26 to each container 5a, passes through the mass 9a, enters the container 5b, flow through the mass 9b and enters the container 5c through the duct 62.

The syphon overflow pipe 10a discharges the treated liquid into the launder 12.

The masses 9a, 9b and 9c may also differ from each other, while the operation of the apparatus is, in other respects, identical to that of the apparatus shown in FIGS. 1 and 2.

The apparatus of FIG. 13 differs from the preceding one because the three series of containers 5d, 5e, and 5f are concentric and side by side instead of superposed; however, also in this case the liquid passes through each set of three containers 5d, 5e and 5f in series, in other words one after the other, and discharges them into the effluent launder 12.

FIG. 14 shows another embodiment of the apparatus according to this invention, which includes two adjacent series of containers 5h and 5k operating in parallel.

In this case feed liquids are introduced into the adjoining but separate feed manifolds 16h and 16k from which they enter the respective containers 5h and 5k, flow through the masses 9h and 9k, and overflow into the launders 12h and 12k from which they leave the apparatus as already described.

FIG. 15 shows an apparatus with three superposed series of containers 5m, 5n and 5p operating in parallel.

The three superposed sets of containers are fed by means of three separate pipes connected to a single feed manifold 22, while the effluents from the three containers are collected in three separate superposed launders 12m, 12n and 12p.

In other respects the operation of this apparatus does not differ from that of the apparatus shown in FIGS. 1 and 2.

In all the above examples the masses of one series of containers may be different from those of the other series, with consistent advantages when processes are performed which require the sequential use of different purifying substances.

Obviously the shape, dimensions, construction materials and details of the various parts of the apparatus according to this invention can vary according to any particular need without departing from the scope of the present invention.

Particularly the structure 3 which supports the containers 5 may have a polygonal plan instead of circular, and be shaped like a truncated cone or pyramid instead of a cylinder, while the path along which the containers move may have any suitable form instead of circular. And in some cases where the layers or bodies of granular substances are to be traversed by one liquid only or by several liquids whose mixing is not dangerous, the movement of the whole of containers could be continuously rotational around the vertical axis of the same.

What we claim is:

1. Apparatus for treating a liquid with a solid, comprising a series of contiguous containers for the solid, means for moving the containers about a closed circuit with intermittent movements spaced apart by dwell periods, means for supplying a liquid to be treated successively to said containers during said dwell periods, means for simultaneously supplying regenerating fluid including at least one wash liquid to other of said containers during said dwell periods, and siphon means for removing said liquid to be treated from said plurality of containers after treatment, said siphon means being so disposed as to maintain the level of liquid in said plurality of containers at least about as high as the height of said solid in said plurality of containers.

2. Apparatus for treating a liquid with a solid, comprising a series of contiguous containers for the solid, means for moving the containers about a closed circuit with intermittent movements spaced apart by dwell periods, means for supplying a liquid to be treated successively to said containers during said dwell periods, means for simultaneously supplying regenerating fluid including at least one wash liquid to other of said containers during said dwell periods, and means establishing a static head of pressure of the liquid to be treated on the solids in said plurality of containers.

3. Apparatus for treating a liquid with a solid, comprising a series of contiguous containers for the solid, means for moving the containers about a closed circuit with intermittent movements spaced apart by dwell periods, means for supplying a liquid to be treated successively to said containers during said dwell periods, and means for simultaneously supplying regenerating fluid including at least one wash liquid to other of said containers during said dwell periods, said moving means comprising reciprocating conveyor means in which a reciprocating conveyor member engages successively with projections on each successive one of a series of said containers upon successive reciprocatory strokes of said conveyor member.

4. Apparatus for treating a liquid with a solid, comprising a series of contiguous containers for the solid, means for moving the containers about a closed circuit with intermittent movements spaced apart by dwell periods, means for supplying a liquid to be treated successively to said containers during said dwell periods, means for simultaneously supplying regenerating fluids including at least one wash liquid to other of said containers during said dwell periods, said closed circuit being circular, said supplying means comprising a plurality of upright conduits one individual to each container and movable with said containers, the lower ends of said conduits discharging into their associated containers, a feed distributor movable with said conduits for supplying fluid to the upper ends of said conduits, partitions dividing the feed distributor into as many compartments as there are conduits, a fixed manifold, partitions dividing a manifold into as many portions as there are fluids to be applied to the solids in the containers, and nozzles for discharging fluid from said manifold into said compartments, the nozzles corresponding in number and spacing to said distributor compartments, said containers and upright conduits and feed distributor being rotatable as a unit about an upright axis.

References Cited by the Examiner
UNITED STATES PATENTS 2,744,066   5/1956   Spiess et al. _____ 210—19

FOREIGN PATENTS 1,167,826   8/1958   France.
773,724   5/1957   Great Britain.

MORRIS O. WOLK, *Primary Examiner.*

JOSEPH SCOVRONEK, *Examiner.*

E. G. WHITBY, *Assistant Examiner.*